Feb. 16, 1954 J. B. MAGGIO 2,669,654

LIMITER AMPLIFIER CIRCUIT

Filed June 27, 1950

INVENTOR
J. B. MAGGIO
BY H. A. Burgess
ATTORNEY

Patented Feb. 16, 1954 2,669,654

UNITED STATES PATENT OFFICE 2,669,654

LIMITER AMPLIFIER CIRCUIT

John B. Maggio, Summit, N. J., assignor to Bell Telephone Laboratories, Incorporated, New York, N. Y., a corporation of New York Application June 27, 1950, Serial No. 170,598

2 Claims. (Cl. 250—27)

Figure 1:
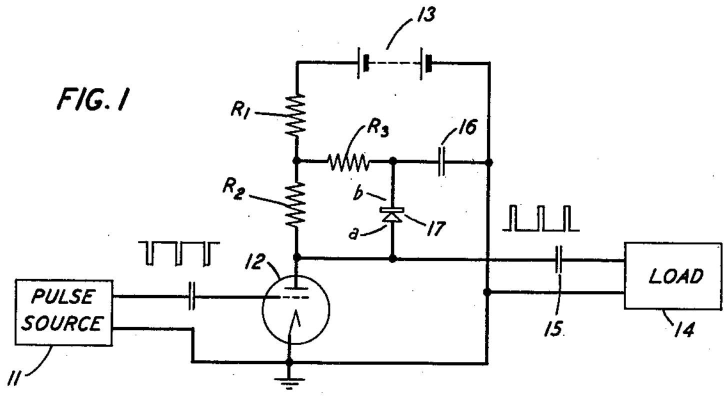

This invention relates to circuits for limiting the potential at a given point in an electrical circuit to predetermined peak voltages. The invention is applicable, for example, to limiting positive or negative peak voltages, or both, and to the generation of square waves.

It is often desirable to limit the output voltage of a device in an electrical circuit to predetermined peak values, for example, either to prevent overloading of the output circuit or to produce a predetermined wave form such as a square wave. Circuits for so limiting the output voltage of such devices are generally known as limiters and are quite commonly associated with electrical amplifiers.

It is an object of the invention to establish a limiting output voltage for such devices which will remain relatively unaffected by changes in the device itself.

Another object of the invention is to accurately limit the output voltage of an electrical amplifier.

In accordance with an illustrative embodiment of the invention which will be described hereinafter in detail, an asymmetrically conducting device connected in the output circuit of an electrical amplifier is biased in its high resistance condition by a relatively small portion of the plate supply voltage. This bias voltage appears across a resistor which is one element of a voltage divider comprising the amplifier and two resistors. The potential of one terminal of the device is isolated from instantaneous changes in plate voltage and hence is held substantially constant; the potential of the other terminal is caused to vary as the instantaneous plate voltage varies. The asymmetric device will remain a high impedance unless the plate voltage exceeds the limiting value and causes the asymmetric device to switch to its low resistance condition. The voltage at which the amplifier will limit is determined primarily by the value of the bias voltage across the asymmetric device. When the asymmetric device is in its low resistance condition, the effective plate load resistance is reduced to the low forward resistance of the asymmetric device so that further increases in the amplifier output are by-passed to ground. Limiting of both positive and negative peaks may be obtained by connecting two asymmetric devices in the plate circuit of the amplifier and by connecting opposite terminals of the two devices to follow the instantaneous plate voltage changes. Limited amplifiers as just described may be employed to limit positive or negative pulses, or both, or may be employed as square wave generators.

A feature of the invention is that although the no-signal voltage output of the device may vary, for example, due to aging or by replacement with a slightly dissimilar device, the values at which the output voltage is limited will be changed by a relatively small amount and will in no event be completely lost.

Another feature of the invention is that accurate limiting at a predetermined value is obtained by performing the limiting function in the output circuit of the device rather than the input circuit, particularly if the device is an amplifier, since larger voltages are available and variations in the limiting value, on a percentage basis, are much smaller.

Figures 2, 2A:
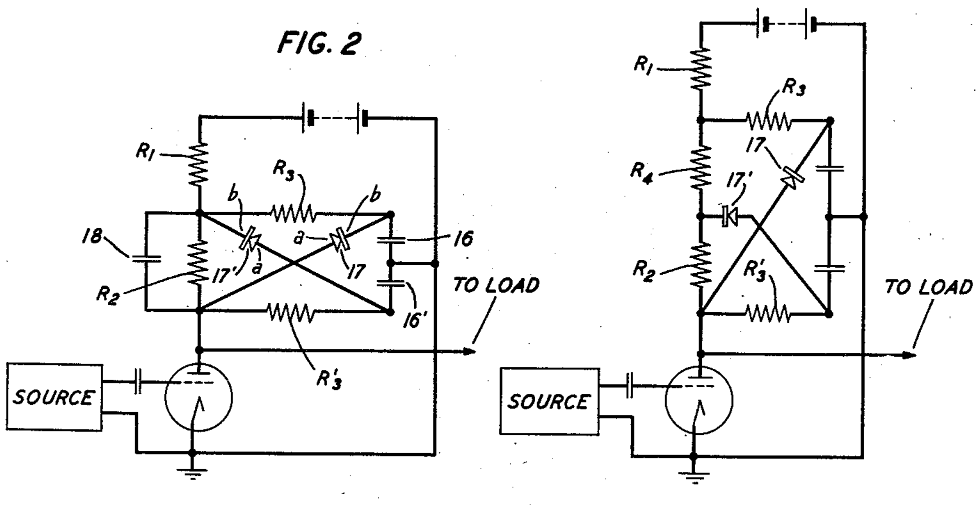

These and other objects and features of the invention may be better understood by a consideration of the following detailed description when read in connection with the drawings, the figures of which show, schematically, output limited amplifiers; the amplifier of Fig. 1 has the positive peaks only of its output limited, and the amplifiers of Figs. 2 and 2A have both the positive and negative peaks of their outputs limited.

Referring now to the illustrative embodiment shown in Fig. 1, a source of negative pulses 11 is connected to the control grid of a space discharge device 12. Plate current is supplied to the tube 12 by the battery 13 through resistors $R_1$ and $R_2$, and the output from the tube 12 is delivered to a load 14 through the coupling condenser 15.

In order that the peak amplitude of the positive output pulses may be limited to a predetermined value, there are provided a resistor $R_3$, condenser 16, and an asymmetric device 17. The condenser 16 will be charged by the battery 13 through resistors $R_1$ and $R_3$ to a value determined by the voltage drop across resistor $R_1$. Resistor $R_3$ and condenser 16 are proportioned to have a time constant which is long relative to the duration of one pulse so that the charge on condenser 16 will be relatively unaffected by instantaneous changes in the plate voltage $e_p$ as long as the asymmetric device 17 is in its high resistance condition. In the absence of input signals, the voltage drop across resistor $R_2$ due to the direct-current plate current causes terminal $a$ of the device 17 to be more negative than terminal $b$ by an amount equal to the voltage drop across resistor $R_2$ so that the asymmetric device is normally biased in its high resistance condition and substantially no current will flow through it. While the asymmetric device 17 is biased in its high resistance condition, the network comprising resistor $R_3$, condenser 16, and the device 17 has substantially no effect on the output delivered by tube 12 to the load.

When a negative pulse is applied to the grid of tube 12, the plate current through the tube and hence the voltage drop across resistors $R_1$ and $R_2$ will decrease, and the instantaneous plate voltage will increase in proportion to the amplitude of the input pulse. As previously indicated, the potential of terminal *b* of the device 17 will remain substantially constant due to the large time constant of resistor $R_3$ and condenser 16. The potential of terminal *a*, however, will follow the instantaneous plate voltage changes so that if the amplitude of the input pulse is large enough, the potential of point *a* will increase to a value substantially equal to the potential of terminal *b*, at which value the asymmetric device 17 will become a low impedance. When the device 17 is in its low resistance condition, the load 14 is shunted by the low forward resistance of the device 17 in series with the condenser 16 so that further increases in the tube output will be by-passed to ground. The condenser 16 will tend to charge to a new value determined by the instantaneous plate voltage, but if the pulse duration is short, the condenser 16 charge will change very little. Further, in any time interval in which the limiting voltage is not exceeded the charge will tend to return to normal by leaking off to ground through resistor $R_3$ and either resistor $R_1$ and battery 13 or resistor $R_2$ and tube 12. Therefore, as long as the asymmetric device 17 is a low impedance, the output signal voltage of tube 12 will be limited to a value determined primarily by the voltage drop across resistor $R_2$.

It may be seen that the zero-to-peak output voltage of the pulses which the tube 12 can deliver to the load 14 is approximately equal to the no-signal voltage drop across resistor $R_2$. Further, in the absence of input to tube 12, the voltage drop across resistor $R_2$ is also the voltage applied across the asymmetric device 17 due to the condenser 16. Resistors $R_1$ and $R_2$, together with the plate resistance $r_p$ of tube 12, form a voltage divider across the plate battery 13 so that the normal no-signal voltage across resistor $R_2$ depends on the value of $R_2$ as compared with the values of $R_1$ and the tube resistance $r_p$. Expressed algebraically:

$$E_l=E_{R_2}=R_2\frac{E_b}{R_1+R_2+r_p}$$

or $$E_l=E_{R_2}=\frac{R_2}{R_1+R_2}(E_B-e_p)$$

where $E_l$=the limiting voltage,
$E_{R_2}$=the voltage drop across resistor $R_2$,
$E_B$=the voltage of battery 13,
$e_p$=the direct-current plate voltage of tube 12,
$r_p$=the internal plate resistance of tube 12.

It may be seen from the above expressions that if $R_1$ is on the order of or larger than $r_p$, the limiting voltage will only be affected a small amount by normal changes in $r_p$ if, for example, the tube is replaced by another having a slightly different plate resistance or if the direct-current plate voltage changes with aging of any of the component parts.

If, for example, the resistors are proportioned as follows:

$$R_1:r_p:R_2::20:9:1$$

and $E_B$ equals 150 volts, the direct-current plate voltage $e_p$ of the tube will equal 45 volts and the limiting voltage, which is also the voltage drop across $R_2$ will equal 5 volts. If the direct-current plate voltage should be increased to 55 volts, the limiting voltage would decrease to 4.53 volts, a change of only 9 per cent with a change in plate voltage of approximately 22 per cent. If the device 17 were connected to limit the output of tube 12 in a more obvious manner, for example, to ground through a biasing battery of 5 volts, an increase in the plate voltage of 10 volts would place the asymmetric device in its low resistance condition even in the absence of tube input so that the tube would deliver no output to the load. Decreases in the direct-current plate voltage of the embodiment shown in Fig. 1 would also cause but small changes in the limiting voltage whereas if the tube were limited in the aforementioned more obvious manner, the limiting voltage would be increased 1 volt for each volt of decrease in the direct-current plate voltage.

Positive and negative limiting may be obtained as shown in Fig. 2. The asymmetric device 17, resistor $R_3$ and condenser 16 are connected in the plate circuit of tube 12 to limit the positive peaks as shown in Fig. 1. To limit the negative peaks, there are also connected in the plate circuit, an asymmetric device 17′, resistor $R_3'$, and condenser 16′ of proportions similar to the elements 17, $R_3$ and 16. However, device 17′ is connected so that terminal *b* will follow the instantaneous plate voltage changes while terminal *a* will be held substantially unaffected by such changes by virtue of the large time constant of resistor $R_3'$ and condenser 16′. Device 17′ also has impressed across it a voltage equal to the voltage drop across resistor $R_2$ and will remain in its high resistance condition unless the instantaneous plate voltage of tube 12 decreases sufficiently so that the potential of terminal *b* of device 17′ is decreased to a value approximately equal to the potential of terminal *a* of device 17′ so as to place device 17′ in its low resistance direction. When device 17′ is in its low resistance direction the load is shunted by the low forward resistance of device 17, resistor 17 and condenser 16′ in series and further decreases in the output voltage of tube 12 will be prevented. The limiting of the negative peaks will not be quite as sharp as the limiting of the positive peaks since when the positive limiting voltage is exceeded, the plate load resistance comprises only the forward resistance of device 17 while, the plate load resistance comprises the resistor $R_2$ as well as the low forward resistance of device 17′ when the negative peak is exceeded. If resistor $R_2$ is small however, this difference will not be appreciable. Further, resistor $R_2$ may be shunted by a condenser 18 if the negative limiting action is not sharp enough.

The circuit of Fig. 2 may be employed as a square wave generator by feeding sine waves into tube 12 and by properly adjusting the values at which the output is limited. It should be noted that the zero-to-peak limiting values for the positive and negative peaks need not be the same. For example, by adding another resistor $R_4$ to the voltage divider as shown in Fig. 2A the positive zero-to-peak limiting voltage can be made larger than the absolute value of the negative zero-to-peak limiting voltage. Also, in an obvious manner, the negative limiting voltage can be made larger than the positive limiting voltage. The circuit of Fig. 1 may also be employed to limit the positive peaks of wave forms other than pulses.

The application of the invention is not limited to space discharge devices or even to amplifiers; further the resistance ratios mentioned are merely descriptive and are in no way restrictive. Even though the invention has been described as relating to specific embodiments, other embodiments and modifications will readily occur to one skilled in the art without departing from the spirit or scope of the invention.

What is claimed is:

1. The combination with a source of signals to be amplified of an output-limited amplifier comprising a space discharge device having a plate, a grid, and a cathode, means for applying said signals between said grid and said cathode, a source of plate current, a resistance voltage divider, means connecting said voltage divider in a plate-cathode circuit with said source between said source and said plate, an output circuit connected to the junction of said resistance voltage divider and said plate, a circuit including a resistor and a capacitor connected between a tap on said voltage divider and said cathode, a two-terminal asymmetrically conducting impedance element, means connecting one terminal of said impedance element to the junction of said plate and said resistance voltage divider and means connecting the other terminal of said impedance element to the junction of said resistor and said capacitor, and said asymmetrically conducting impedance element poled to receive a reverse bias from said voltage divider in the absence of signals from said signal source.

2. The combination in accordance with claim 1 wherein said voltage divider applies to said asymmetrically conducting impedance element a reverse bias which is approximately equal to the maximum desired zero-to-peak output voltage of said amplifier.

JOHN B. MAGGIO.

References Cited in the file of this patent

UNITED STATES PATENTS

| Number | Name | Date |
|---|---|---|
| 2,215,175 | Fewings | Sept. 17, 1940 |
| 2,383,420 | Scoles | Aug. 21, 1945 |
| 2,418,480 | Pritchard | Apr. 8, 1947 |
| 2,439,872 | Sanders | Apr. 20, 1948 |
| 2,519,238 | Duke | Aug. 15, 1950 |
| 2,550,715 | Norton | May 1, 1951 |